Patented June 4, 1935

2,003,655

UNITED STATES PATENT OFFICE 2,003,655

COMPOSITION OF MATTER

Ernest W. Reid, Pittsburgh, Pa., assignor to Carbide and Carbon Chemicals Corporation, a corporation of New York No Drawing. Application September 23, 1931, Serial No. 564,708

3 Claims. (Cl. 134—79)

The invention relates to compositions containing cellulose acetate, and includes a novel group of solvents for making such compositions. My new solvents comprise mixtures of ethylene dichloride with aliphatic alcohols having at least three carbon atoms in their structure.

Previous attempts have been made to utilize the solvent properties of various chlorinated compounds in forming cellulose acetate compositions. Such attempts, with carbon tetrachloride for example, have been unsuccessful for the reason that aging tests upon these compositions have demonstrated that cellulose acetate compositions so prepared undergo gradual and steady deterioration upon standing.

I have discovered that mixtures of ethylene dichloride and certain aliphatic alcohols are good solvents for cellulose acetate, and are useful in making lacquers, dopes, etc. Aging tests upon cellulose acetate compositions containing my new solvents show that these compositions do not deteriorate after standing for long periods of time.

Ethylene dichloride and the aliphatic alcohols from which my new solvents are formed are individually non-solvents for cellulose acetate, but mixtures of these substances as disclosed herein are excellent solvents for cellulose acetate, and clear, non-viscous solutions can be readily prepared therefrom.

The alcohols from which the new solvents may be formed are those having at least three carbon atoms in the structure, for example isopropyl alcohol and n-butyl alcohol are suitable alcohols and these alcohols are preferred. Ethylene dichloride has a boiling point of about 83° C. and a specific gravity of 1.257 at 20°/4° C., but the physical properties of the solvent mixture may be varied by choosing the alcohol and the proportion thereof so as to produce a solvent having a rate of evaporation and density best suited for a particular application.

I prefer to use mixtures containing about 70% by volume of ethylene dichloride and about 30% by volume of isopropyl or n-butyl alcohol, but other alcohols having at least three carbon atoms, mixtures of alcohols, and other proportions may be used. Mixtures prepared by combining the alcohols above butyl alcohol with ethylene dichloride are not as good solvents as those formed from the alcohols mentioned, but such mixtures may be useful, for example in utilizing the lower vapor pressures and evaporation rates of the higher alcohols.

Cellulose acetate compositions formed in accordance with my invention may be diluted or extended with the usual diluents or non-solvents. For this purpose benzene, toluene, or xylene may be used, or other known diluents may be employed.

I claim:

1. The method of producing a lacquer composition which does not deteriorate after prolonged standing, which method comprises preparing a mixture consisting of about 70 per cent. by volume of ethylene dichloride and about 30 per cent. by volume of an alcohol selected from the group consisting of isopropyl and n-butyl alcohol, and dissolving cellulose acetate in said mixture.

2. The method of producing a lacquer composition highly resistant to deterioration upon prolonged standing, which method comprises preparing a mixture consisting of ethylene dichloride and isopropyl alcohol, and dissolving cellulose acetate therein.

3. The method of producing a lacquer composition which does not deteriorate after prolonged standing, which method comprises preparing a mixture consisting of ethylene dichloride and n-butyl alcohol, and dissolving cellulose acetate in said mixture.

ERNEST W. REID.